(12) United States Patent
Ihle et al.

(10) Patent No.: US 8,174,157 B2
(45) Date of Patent: May 8, 2012

(54) ELECTRICALLY COMMUTATED DC MOTOR FOR A LIQUID PUMP

(75) Inventors: Olai Ihle, Eckental (DE); Georg Bernreuther, Nürnberg (DE); Klaus Weiske, Nürnberg (DE)

(73) Assignee: Bühler Motor GmbH, Nürnberg (DE)

( * ) Notice: Subject to any disclaimer, the term of this patent is extended or adjusted under 35 U.S.C. 154(b) by 325 days.

(21) Appl. No.: 12/654,238

(22) Filed: Dec. 15, 2009

(65) Prior Publication Data

US 2010/0158723 A1 Jun. 24, 2010

(30) Foreign Application Priority Data

Dec. 19, 2008 (DE) .................. 10 2008 064 161

(51) Int. Cl.
*F04D 13/06* (2006.01)
(52) U.S. Cl. .................. 310/71; 310/194; 310/52
(58) Field of Classification Search .................. 310/71, 310/52, 194; 417/423.7, 366
See application file for complete search history.

(56) References Cited

U.S. PATENT DOCUMENTS

| 3,572,982 | A | * | 3/1971 | Kozdon | 417/423.7 |
|---|---|---|---|---|---|
| 5,457,826 | A | * | 10/1995 | Haraga et al. | 4/541.4 |
| 5,723,932 | A | * | 3/1998 | Ito et al. | 310/248 |
| 6,445,104 | B1 | * | 9/2002 | Sato | 310/239 |
| 7,296,416 | B2 | * | 11/2007 | Akei et al. | 62/3.2 |
| 2003/0168925 | A1 | * | 9/2003 | Bernreuther et al. | 310/156.23 |
| 2005/0039880 | A1 | * | 2/2005 | Scott | 165/80.2 |
| 2006/0152907 | A1 | * | 7/2006 | Rathmann | 361/720 |

FOREIGN PATENT DOCUMENTS

| DE | 196 46 617 | 5/1998 |
|---|---|---|
| DE | 102 39 512 | 3/2004 |
| GB | 2307947 | 6/1997 |

* cited by examiner

*Primary Examiner* — Quyen Leung
*Assistant Examiner* — Naishadh Desai
(74) *Attorney, Agent, or Firm* — Jacobson Holman PLLC

(57) ABSTRACT

An electrically commutated DC motor (1) for a liquid pump (2) with a pump housing (3) with a suction connector (4) and a pressure connector (5) for connection to a hydraulic circuit, an essentially disk-like pump rotor (6) mounted to rotate in the pump housing, consisting of an impeller (7) with several pump vanes and a permanent magnet (8), a partition (11) separating a pump space (9) from a dry space (10), in which the partition is arranged in an axial gap (12) between the pump rotor (6) and several axially aligned wound stator poles (14) of the DC motor. The present invention configures a DC motor, so that it can be installed simply and reliably, is designed particularly robust and therefore has a very long operating lifetime.

18 Claims, 6 Drawing Sheets

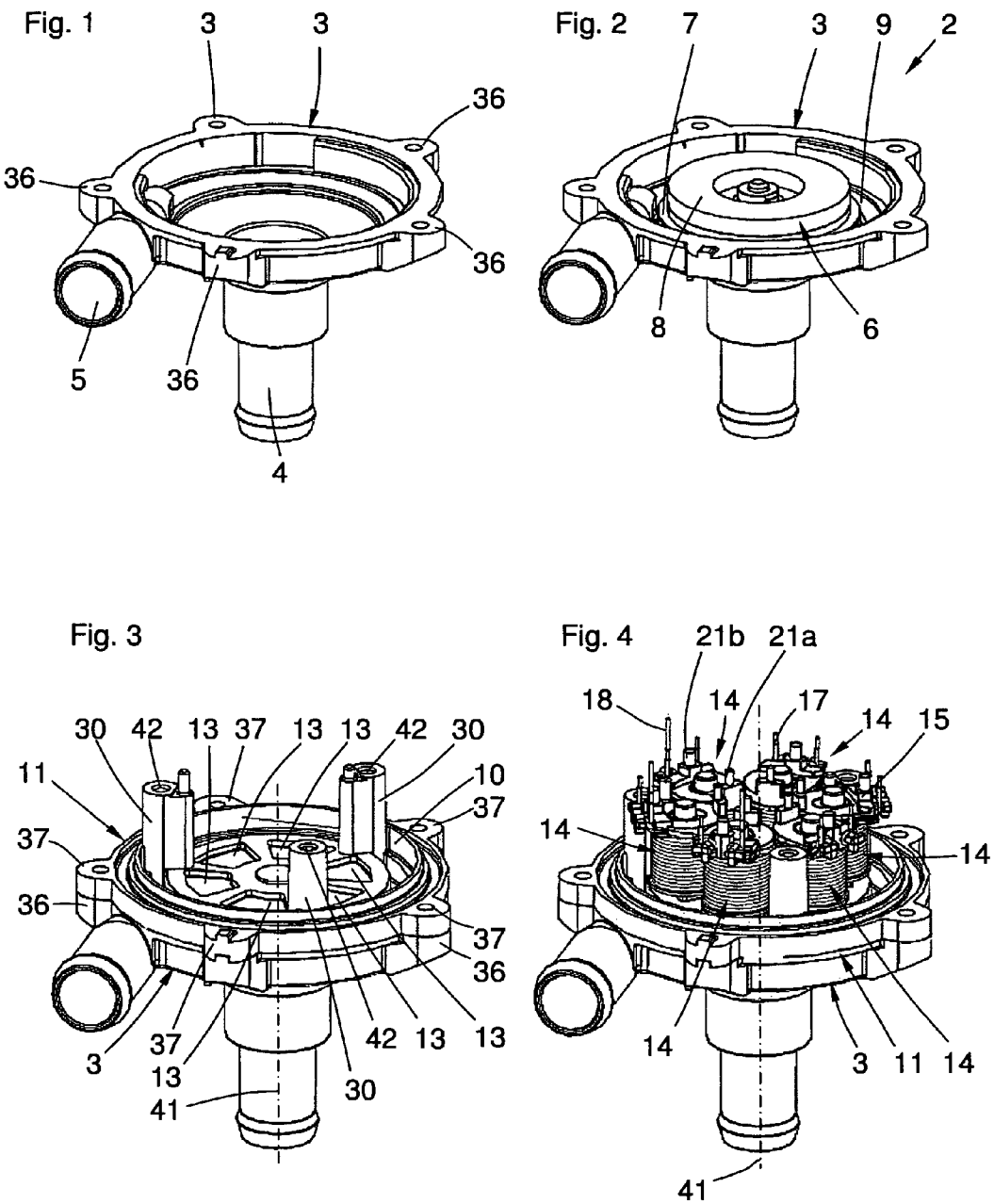

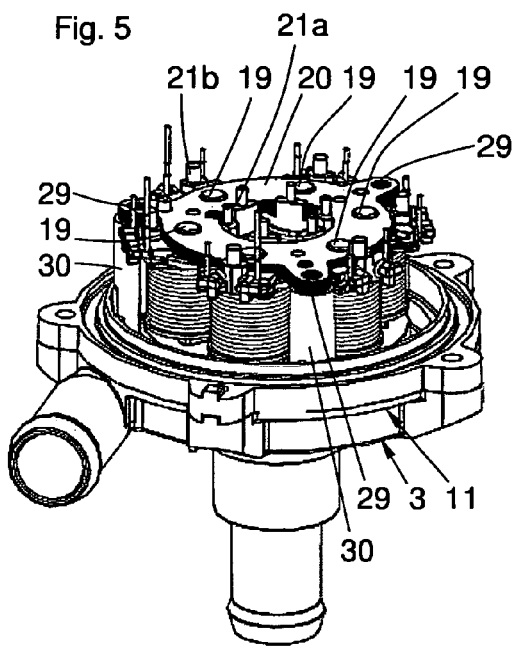
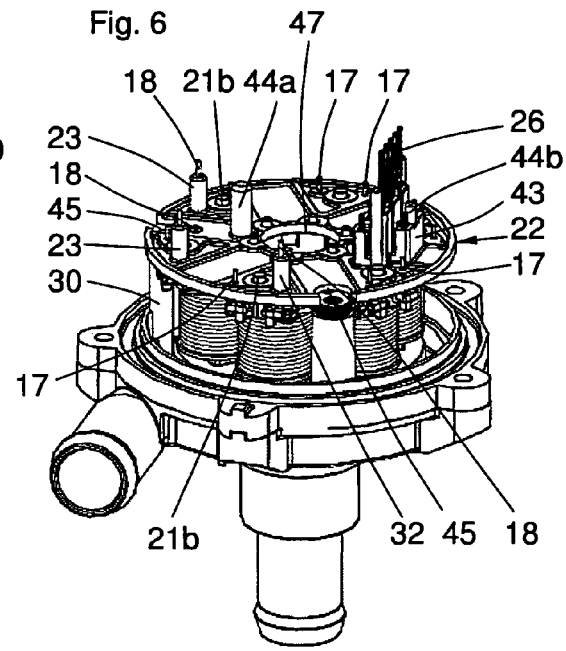
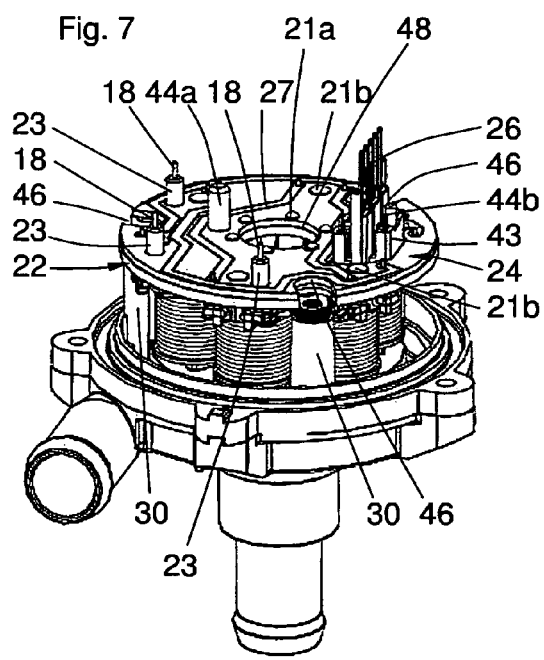
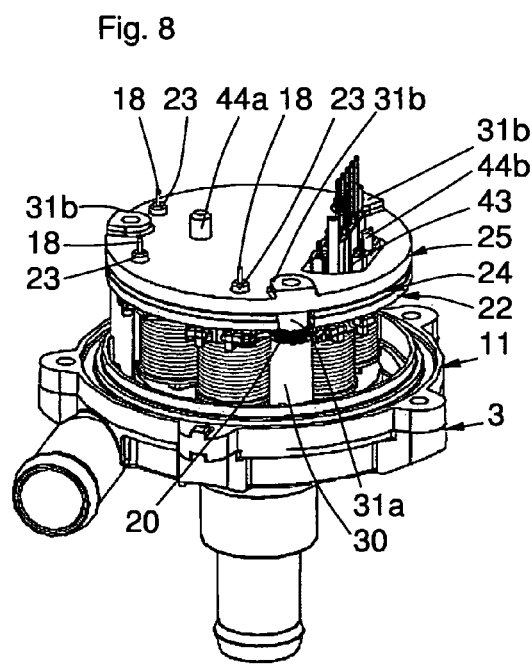

ELECTRICALLY COMMUTATED DC MOTOR FOR A LIQUID PUMP

BACKGROUND OF THE INVENTION (1) Field of the Invention

The invention concerns an electrically commutated DC motor for a liquid pump with a pump housing with a suction connector and a pressure connector for connection to a hydraulic circuit, an essentially disk-like pump rotor mounted to rotate in the pump housing, consisting of an impeller with several pump vanes and a permanent magnet, and a partition separating a pump space from a dry space, the partition being arranged in an axial gap between the pump rotor and several axially aligned wound stator poles of the DC motor.

(2) Description of Related Art Including Information Disclosed Under 37 CFR 1.97 and 1.98

A generic electronically commutated DC motor for a liquid pump is known from DE 196 46 617 A1. The connections in the known DC motor are only held in a plug cover without special securing measures and are in direct contact with a circuit board. The same circuit board is directly connected to winding connections. This structure is not stable and, under extreme loads and after a longer running time, leads to damage and failures.

An object of the present invention is to configure a DC motor, so that it is simple and reliable to install, is designed particularly robust and therefore has a very long lifetime.

BRIEF SUMMARY OF THE INVENTION

The object is met solved according to the invention in a commutated DC motor for a liquid pump having a pump housing with a suction connector and a pressure connector for connection to a hydraulic circuit. The DC motor comprises a motor shaft; an essentially disk-shaped pump rotor mounted to the motor shaft to rotate in the pump housing, the rotor having of an impeller with several pump vanes and a permanent magnet; a plurality of axially aligned wound stator poles; an axial air gap between the pump rotor and the axially aligned wound stator poles; a partition separating a pump space from a dry space, the partition being arranged in the axial gap; a plurality of insulation elements having moldings, the insulation elements being provided on the poles; a plurality of stator windings each having first and second winding ends, the stator windings being wound on the poles, the first and second winding ends being mechanically fastened to the moldings; a first circuit board mechanically and electrically connected to the first winding ends and arranged in a first plane parallel to the partition, the first circuit board having conductor tracks for interconnection of the first winding ends of the stator windings; a second circuit board mechanically and electrically connected to one part of the second winding ends and provided with a control circuit arranged in a second plane parallel to the partition; and a contact support arranged between the insulation elements and the first circuit board, the contact support having contact receptacles for mechanical fastening of connection contacts.

By separation of the individual functional planes, a situation is achieved in which mechanical loads and electronic interferences are kept away from sensitive components and contacts on the equipped circuit board. The plug connections are secured on their own support plate and fixed in the stator, so that mechanical loads can be excellently diverted. The first circuit board is designed very simply and produced, mounted and contacted with known processes. High reliability in the assembly process is therefore guaranteed.

BRIEF DESCRIPTION OF THE SEVERAL VIEWS OF THE DRAWINGS

A practical example of the invention is explained below further below with reference to the drawing. In the drawing:

FIG. 1 shows a three-dimensional view of a pump housing,

FIG. 2 shows the pump housing from FIG. 1 with an assembled pump rotor,

FIG. 3 shows the arrangement from FIG. 2 with a mounted partition,

FIG. 4 shows the arrangement of FIG. 3 with mounted wound stator poles,

FIG. 5 shows the arrangement from FIG. 4 with a mounted stator return,

FIG. 6 shows the arrangement from FIG. 5 with the mounted contact support,

FIG. 7 shows the arrangement from FIG. 6 with a mounted circuit board,

FIG. 8 shows the arrangement from FIG. 7 with a mounted heat conducting element.

DETAILED DESCRIPTION OF THE INVENTION

Figure 9:
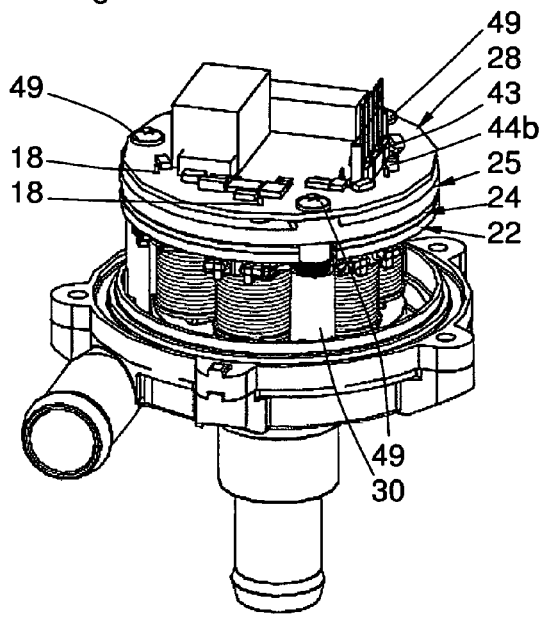
FIG. 9 shows the arrangement from FIG. 8 with an equipped circuit board.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a three-dimensional view of a pump housing 3, consisting of plastic material with a suction connector 4, a pressure connector 5 and screw mounting eyes 36.

FIG. 2 shows the pump housing 3 from FIG. 1 with a pump rotor 6 mounted in a pump space 9, which is mounted to rotate on a shaft. The pump rotor 6 consists essentially of a permanent magnet 8 in the form of an alternating magnetized permanent magnet ring connected to an impeller 7.

FIG. 3 shows the arrangement from FIG. 2 with a mounted partition 11 that separates the pump space from a dry space 10. The partition 11 also has screw mounting eyes 37 corresponding to the screw mounting eyes 36 of the pump housing 3. The partition 11 has recesses 13 to accommodate stator poles, especially their pole shoes. The partition is also in one piece with three fastening bushings 30 provided with internal thread 42, which extend parallel around a motor shaft 41 from the partition plane 11.

FIG. 4 shows the arrangement from FIG. 3 with six mounted wound stator poles 14 aligned axially and parallel and uniformly distributed around the motor shaft 41. The stator poles 14 are each enclosed by an insulation element 15 provided with a stator winding 16. The windings are mechanically fastened to the insulation element 15 and their ends 17, 18 extend parallel to motor shaft 41. First winding ends 17 end in a first plane, whereas second winding ends 18 are designed longer than the first winding ends 17 and end in a second plane. The insulation elements 15 are in one piece with receptacles 21a, 21b that extend pin-like axially and parallel from the side facing away from the pump. Further description of the stator poles occurs relative to FIGS. 16 to 19.

FIG. 5 shows the arrangement of FIG. 4 with a mounted stator return 20, which consists of a laminated core of several identically designed return sheets. This stator return 20 has fastening devices 29, consisting of three radial protrusions with disk-like punch-outs that are covered with the inside thread 42 of the fastening bushings 30. Protrusions are provided on two fastening bushings 30, in addition to inside thread 42, which are dimensioned differently and are supposed to prevent incorrect assembly of the stator return 20. Each pole has a mounting pin 19, which engages in a correspondingly designed recess of the stator return 20. The stator return 20 is designed ring-like and runs within the circle described by the receptacles 21a and 21b. The stator return 20 is secured against loosening with the stator poles 14 by a deformation process, like caulking.

FIG. 6 shows the arrangement from FIG. 5 with a mounted contact support 22, consisting of plastic material. The contact support 22 is in one piece with contact receptacles 43, mounting pins 23, openings for the receptacles 21a and 21b of the insulation elements, openings for the winding end 17 with recesses 45 in the area of the fastening bushings 30, with a central recess 47 and centering pins 44a, 44b. The mounting pins 23 are designed hollow and accommodate the second winding ends 18, which, in the assembled state of the contact support, protrude significantly from the hollow mounting pins 23. The contact supports are shaped so that U-shaped bent contacts can be sealed in them. Part of the U-shaped connection contacts 26 and, on one side, on a first side directed toward the motor shaft, and on the other side in a plug plane, and another part of the U-shaped connection contacts 26 and, on the one side, on a second side facing away from the motor shaft, and on the other side in the plug plane.

FIG. 7 shows the arrangement in FIG. 6 with a mounted circuit board 24, which is essentially formed with the same passages and recesses as the contact support 22. In particular, the circuit board 24 has recesses 46 in the area of the fastening bushings 30, central recess 48 and different openings for the receptacles 21a, 21b of the insulation elements, for the hollow mounting pins 23 of the contact support and for contact openings for electrical and mechanical connection of the first shorter winding end 17 to the circuit board, especially with soldering eyes that are partially connected to each other via conductor tracks 27. An opening for the contact receptacles 43 and the centering pins 44a is also present. The receptacles 21a and 21b are shaped according to a heat deformation process, so that the circuit board 24 and the contact support 22 are firmly connected to the six insulation elements in shape-mated fashion, the receptacles 21a, 21b being deformed in the fashion of rivet heads.

FIG. 8 shows the arrangement of FIG. 7 with a mounted heat conducting element 25. The heat conducting element 25 consists of aluminum and is provided with recesses for hollow mounting pins 23, centering pins 44a and the contact receptacles 43. The heat conducting element 25 is also in one piece with spacers 31a, which engage in recesses 45 of the contact support 22 and recesses 46 of circuit board 24 and extend up to the return 20. On the side of the heat conducting element opposite the spacers 31a, additional spacers 31b are provided, which serve to accommodate an additional circuit board. The heat conducting element consists of a first essentially disk-like area and a second essentially hollow cylindrical area, which is centrally connected to the disk-like area and extends over the central recess 48 of the circuit board 24 and the central recess 47 of contact support and a central recess of the stator return up to the partition 11.

FIG. 9 shows the arrangement from FIG. 8 with an equipped circuit board 28. The circuit board 28 has contact openings for passage of the winding ends 18, which are electrically and mechanically connected at soldering eyes to circuit board 28. This circuit board 28 also has an opening for the contact receptacles 43. The circuit board 28 lies axially against the spacers 31b and radially against the centering pins 44a, 44b and is screwed to the fastening bushings 30 with screws 49, so that they also fasten heat conducting element 25 and the stator return, in addition to the circuit board 28.

Figure 10:
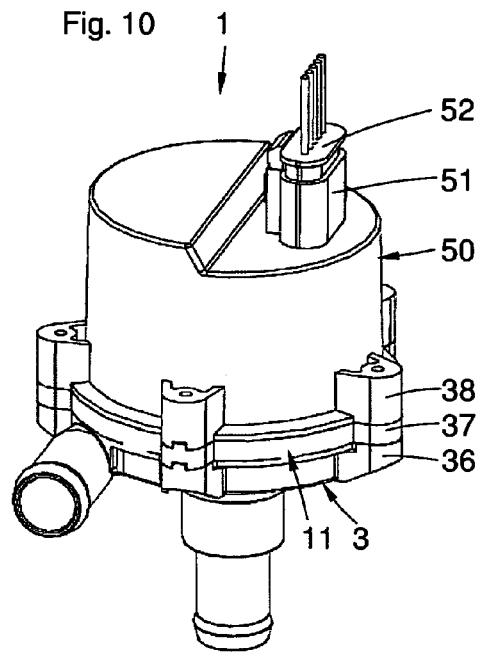
FIG. 10 shows the arrangement from FIG. 9 with a mounted motor housing.

FIG. 10 shows the arrangement from FIG. 9 with mounted motor housing 50, which is in one piece with a plug housing 51, into which a plug 52 is inserted. The motor housing is also in one piece with screw fastening eyes 38, in which these coincide with the screw fastening eyes 37 of partition 11 and the screw fastening eyes 36 of the pump housing.

Figure 11:
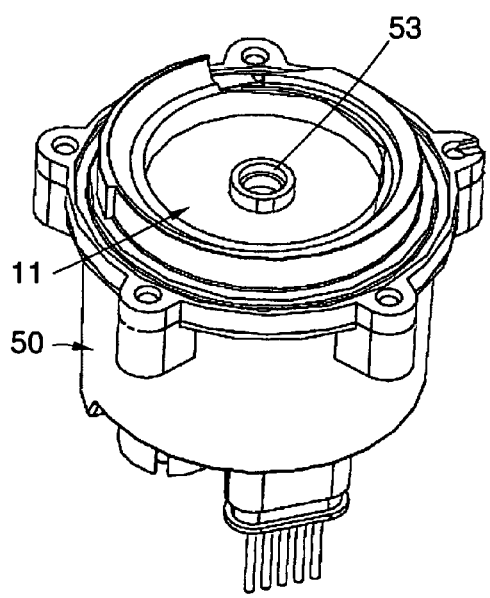
FIG. 11 shows a view of the partition from an opposite perspective.

FIG. 11 shows a view from the opposite perspective of the partition 11 with the motor housing connected to it. The partition 11 and the motor housing delimit the dry space, in which the stator of the DC motor is situated. The partition 11 is in one piece with a bearing mount 53 to accommodate an axial bearing to support the pump rotor.

Figure 12:
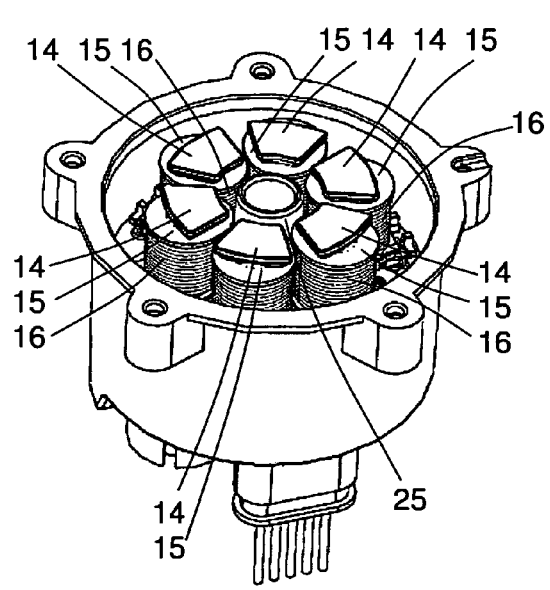
FIG. 12 shows a view of the stator poles from the same perspective.

FIG. 12 shows a view from the same perspective of the stator poles 14, with the insulation elements 15, windings 16 and the hollow cylindrical area of the heat conducting element 25.

Figure 13A:
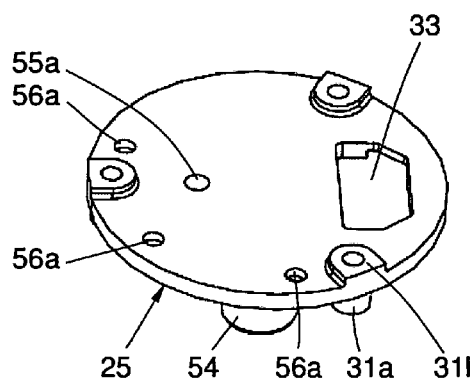
FIGS. 13a, 13b show views of the heat conducting element.
Figure 13B:
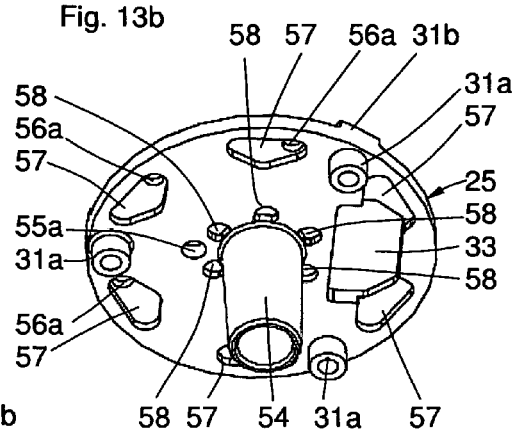

FIGS. 13a, 13b show views of the heating conducting element 25 with an opening 55a for the centering pins 44a, three openings 56a for the mounting pins 23 of the contact support, a plug recess 33, spacers 31a and 31b and a hollow cylindrical area 54 arranged centrally on the heat conducting element.

In FIG. 13b, large recesses 57 and small recesses 58 are also provided for the soldering sites and rivet heads.

Figure 14A:
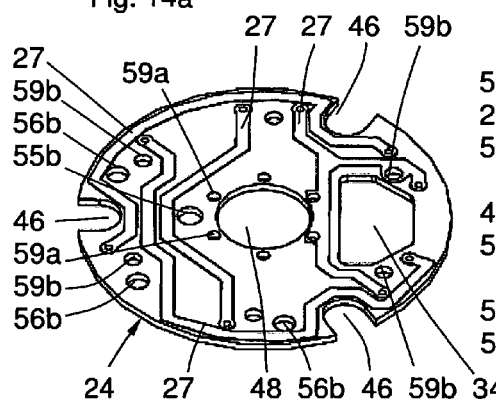
FIGS. 14a, 14b show views of the circuit board.
Figure 14B:
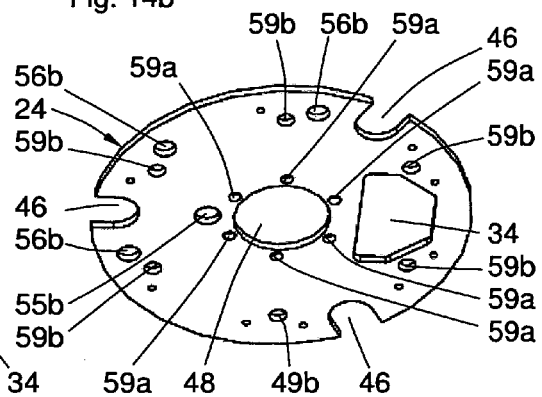

FIGS. 14a, 14b show views of the circuit board 24 with conductor tracks 27, openings 59a for internal mounting of the insulation element, openings 59b for outer mounting of the insulation element, central recess 48, opening 55b for the centering pins 44a, openings 56b for the mounting pins 23 of the contact support, recesses 46 for the spacers of the heat conducting element, a plug recess 34 and additional openings for the winding ends.

Figure 15A:
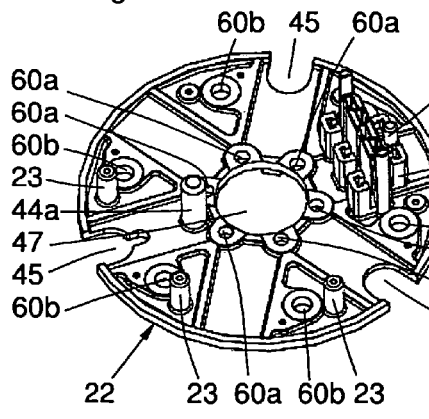
FIGS. 15a, 15b show views of the contact support.
Figure 15B:
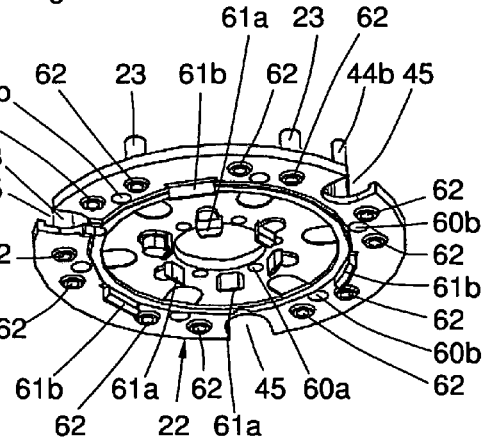

FIGS. 15a, 15b show views of the contact support 22 with centering pins 44a, 44b, the hollow mounting pins 23, the contact receptacles 43 that are in one piece with the contact support, recesses 45 for the spacer of the heating conducting element, the central recess for accommodating the cylindrical part of the heat conducting element, openings 60a for the internal receptacles of the insulation elements, openings 60b for the external receptacles of the insulation elements and openings for the winding wire ends. Inner centering devices 61a, outer centering devices 61b for mounting on the stator return and joining aids 62, designed essentially conical, in order to be able to join the winding ends more simply during assembly of the contact support, are also shown in FIG. 15b.

Figure 16:
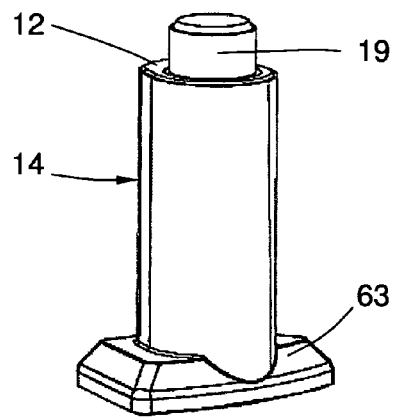
FIG. 16 shows a view of a stator pole.

FIG. 16 shows a view of a stator pole 14, comprising a mounting hole 19 for connection to the stator return and a pole shoe 63, having a roughly circular segment-like cross-sectional surface. The stator pole 14 in the present practical example consists of a magnetically conducting material pressed and sintered from the powder form.

Figure 17:
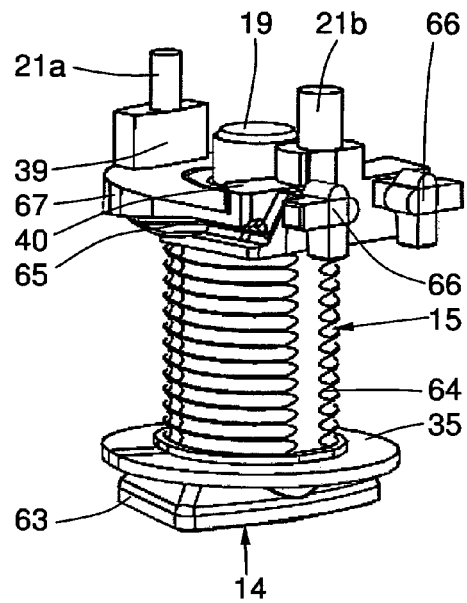
FIG. 17 shows the stator pole from FIG. 16 with mounted insulation elements.

FIG. 17 show the stator pole from FIG. 16 with the mounted insulation element 15, with the contact flange 67, a collar 35, grooves 64 in the base of the insulation element, which serve to achieve regular arrangement of the winding wires, a wire guide 65, in order to bring the wire ends in defined fashion against molding 66 after the winding process, and then to wind around the corresponding fastening devices, in which one winding is sufficient. After production of the winding, both winding ends 17 are aligned axial and parallel to the pole axis, and later also the motor axis. The insulation element also has receptacles 39 and 40 to accommodate the stator return 20. The inner pin-like receptacle 21a and the outer pin-like receptacle 21b are connected to the receptacles 39 and 40. Both are aligned axial and parallel.

Figure 18:
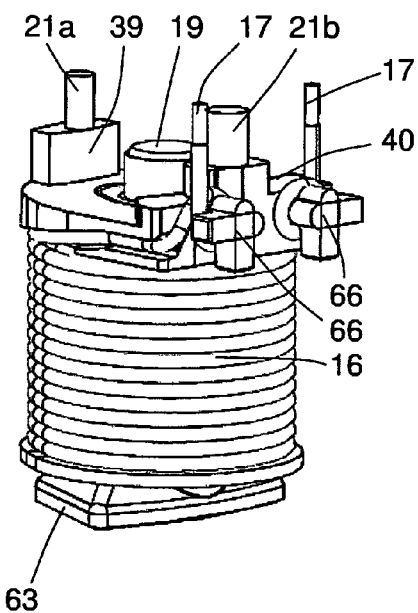
FIG. 18 shows the arrangement from FIG. 17 with a winding.

FIG. 18 shows the arrangement from FIG. 17 wound with a winding 16. It is readily apparent here how the wire guide is positioned with the winding wire and how the winding wire end is wound around the fastening device.

Figure 19:
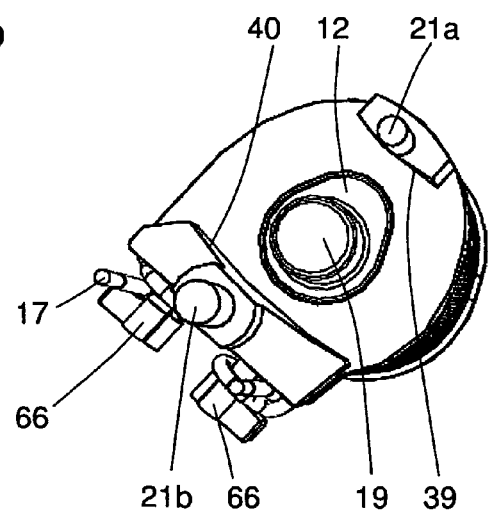
FIG. 19 shows the arrangement from FIG. 18 from another perspective.

FIG. 19 shows the arrangement from FIG. 18 from another perspective. It is readily apparent here that the pole has a polygonal cross section 12. This primarily serves to prevent rotation and finally also for better utilization of space.

Figure 20A:
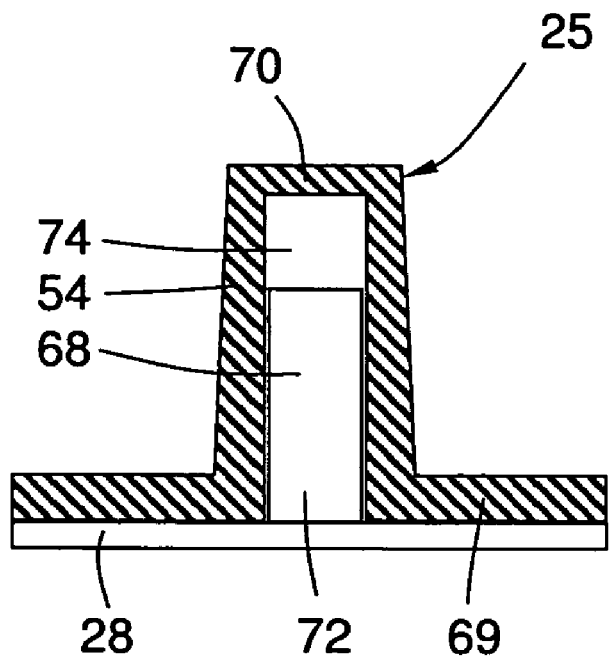
FIG. 20a shows a second variant of the heat conducting element and FIG. 20b shows a third variant of the heat conducting element.

FIG. 20a shows a second variant of the heat conducting element 25, in which the disk-like area 69 is provided centrally with a central opening 72 and the hollow cylindrical area 54 is closed by a bottom 70 on its side facing the pump impeller. Through this embodiment, the possibility is obtained of accommodating a capacitor 68 arranged on circuit board 28 in space-saving fashion in a mounting space 74 of the heat conducting element 25.

Figure 20B:
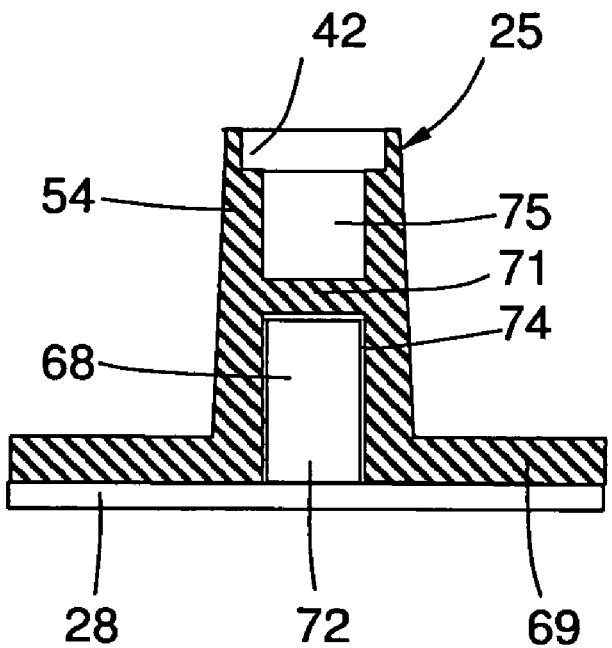

FIG. 20b shows a third variant of the heat conducting element 25, in which the hollow cylindrical area 54 is open on both sides, but a partition 71 is provided in its center area, which separates the dry space from the wet space. In this variant, the partition 11 (not shown here) is also perforated, so that an additional wet space 75 extends to partition 71. The third variant combines the first two variants of the heat conducting element 25 with each other. In the first place, an installation space for the capacitor 68 is present and, in the second place, part of the hollow cylindrical area 54 can also be used as a cooling channel. On the end of the hollow cylindrical area 54, there is a receiving space 73 for a bearing.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMBERS

| | |
|---|---|
| 1 | DC motor |
| 2 | Liquid pump |
| 3 | Pump housing |
| 4 | Suction connector |
| 5 | Pressure connector |
| 6 | Pump rotor |
| 7 | Pump impeller |
| 8 | Permanent magnet |
| 9 | Pump space |
| 10 | Dry space |
| 11 | Partition |
| 12 | Polygonal cross section |
| 13 | Recesses |
| 14 | Stator pole |
| 15 | Insulation element |
| 16 | Stator winding |
| 17 | First winding end |
| 18 | Second winding end |
| 19 | Mounting pin |
| 20 | Stator return |
| 21a | Receptacle |
| 21b | Receptacle |
| 22 | Contact support |
| 23 | Hollow mounting pin |
| 24 | First circuit board |
| 25 | Heat conducting element |
| 26 | Connection contact |
| 27 | Circuit |
| 28 | Conductor track |
| 29 | Equipped circuit board |
| 30 | Fastening device |
| 31 | Fastening bushing |
| 31a | Spacer |
| 31b | Spacer |
| 33 | Plug recess |
| 34 | Plug recess |
| 35 | Collar |
| 36 | Screw connection eye |
| 37 | Screw connection eye |
| 38 | Screw connection eye |
| 39 | Receptacles for return |
| 40 | Receptacles for return |
| 41 | Motor shaft |
| 42 | Internal thread |
| 43 | Contact receptacle |
| 44a | Centering pin |
| 44b | Centering pin |
| 45 | Recesses in contact support |
| 46 | Recesses in circuit board |
| 47 | Central recess in support |
| 48 | Central recess in circuit board |
| 49 | Screw |
| 50 | Motor housing |
| 51 | Plug housing |
| 52 | Plug |
| 53 | Bearing mount |
| 54 | Hollow cylindrical area |
| 55a | Opening for centering pin |
| 55b | Opening for centering pin |
| 56a | Opening for mounting pin |
| 56b | Opening for mounting pin |
| 57 | Large recess |
| 58 | Small recesses |
| 59a | Opening for receptacle inside |
| 59b | Opening for receptacle outside |
| 60a | Opening for receptacle inside |
| 60b | Opening or receptacle outside |
| 61a | Internal centering device |
| 61b | External centering device |
| 62 | Joining aid |
| 63 | Pole shoe |
| 64 | Groove |
| 65 | Wire guide |
| 66 | Moldings |
| 67 | Contact flange |
| 68 | Capacitor |
| 69 | Disk-like area |
| 70 | Bottom |

-continued

LIST OF REFERENCE NUMBERS

| 71 | Partition |
| 72 | Central opening |
| 73 | Receiving space for bearing |
| 74 | Receiving space for capacitor |
| 75 | Additional wet space |

What is claimed is:

1. A commutated DC motor for a liquid pump having a pump housing with a suction connector and a pressure connector for connection to a hydraulic circuit, the DC motor comprising:
a motor shaft;
an essentially disk-shaped pump rotor mounted to the motor shaft to rotate in the pump housing, the rotor having of an impeller with several pump vanes and a permanent magnet;
a plurality of axially aligned wound stator poles;
an axial air gap between the pump rotor and the axially aligned wound stator poles;
a partition separating a pump space from a dry space, the partition being arranged in the axial gap;
a plurality of insulation elements having moldings, the insulation elements being provided on the poles;
a plurality of stator windings each having first and second winding ends, the stator windings being wound on the poles, the first and second winding ends are mechanically fastened to the moldings;
a first circuit board mechanically and electrically connected to the first winding ends and arranged in a first plane parallel to the partition, the first circuit board having conductor tracks for interconnection of the first winding ends of the stator windings;
a second circuit board mechanically and electrically connected to one part of the second winding ends and provided with a control circuit arranged in a second plane parallel to the partition; and
a contact support arranged between the insulation elements and the first circuit board, the contact support having contact receptacles for mechanical fastening of connection contacts.

2. The DC motor according to claim 1, wherein the connection contacts are electrically and mechanically connected exclusively to the second circuit board.

3. The DC motor according to claim 1, wherein the insulation elements are provided with receptacles for fastening of the contact support.

4. The DC motor according to claim 3, wherein each insulation element is provided with first and second receptacles, the first receptacle being arranged radially inward with reference to the motor shaft and the second receptacle being arranged radially outward.

5. The DC motor to claim 1, wherein the contact support and the first circuit board are connected to the insulation element according to a heat deformation process.

6. The DC motor according to claim 1, further comprising a heat conducting element and wherein the contact support is equipped with mounting pins to accommodate the first circuit board and the heat conducting element.

7. The DC motor according to claim 1, further comprising mounting pins and wherein at least one mounting pin is hollow and serves as a guide and mounting device for the second winding ends.

8. The DC motor according to claim 1, wherein the poles have mounting pins to accommodate a stator return.

9. The DC motor according to claim 8, wherein the stator return has fastening devices that lie against fastening bushings that protrude in a post-like manner from the partition.

10. The DC motor according to claim 8, wherein the stator return is centered on first and second mounting devices of the insulation elements and the contact support has first and second centering devices, with which it is centered on the stator return.

11. The DC motor according to claim 8, wherein the stator return consists of a laminated core.

12. The DC motor according to claim 1, wherein a heat conducting element is arranged between the two circuit boards parallel to partition.

13. The DC motor according to claim 6, wherein the heat conduction element is in one piece with spacers that engage in recesses of the contact support and recesses of the first circuit board and extend up to the stator return.

14. The DC motor according to claim 8, wherein the second circuit board, the heat conducting element and the stator return are screwed to the partition via the fastening bushings.

15. The DC motor according to claim 6, wherein the first circuit board, the heat conducting element and the second circuit board each have a plug recess for the connection contacts and their mounting part.

16. The DC motor according to claim 6, wherein the heat conducting element consists of a disk-like area and a central hollow cylindrical area arranged within a circle defined by the stator poles and extending to the partition.

17. The DC motor according to claim 6, wherein the heat conducting element is made essentially of aluminum.

18. The DC motor according to claim 16 wherein the heat conducting element has a central opening in its disk-like area and a receiving space for a capacitor in the central hollow cylindrical area, the capacitor being arranged on the second circuit board and extending into the receiving space.

* * * * *